United States Patent
Cai et al.

(10) Patent No.: US 8,948,612 B2
(45) Date of Patent: Feb. 3, 2015

(54) SYSTEM AND METHOD FOR GENERATING SOFT DECISION RELIABILITY INFORMATION FROM HARD DECISIONS IN AN OPTICAL SIGNAL RECEIVER

(75) Inventors: Yi Cai, Jackson, NJ (US); Hussam G. Batshon, Eatontown, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 561 days.

(21) Appl. No.: 12/960,438

(22) Filed: Dec. 3, 2010

(65) Prior Publication Data
US 2012/0141144 A1 Jun. 7, 2012

(51) Int. Cl.
*H04B 10/61* (2013.01)
*H04L 1/00* (2006.01)
*H04L 1/20* (2006.01)
*H04L 25/06* (2006.01)

(52) U.S. Cl.
CPC ............ *H04B 10/616* (2013.01); *H04L 1/0045* (2013.01); *H04L 1/20* (2013.01); *H04L 25/067* (2013.01)
USPC ...................................................... 398/203

(58) Field of Classification Search
USPC ......................................................... 398/203
See application file for complete search history.

(56) References Cited

U.S. PATENT DOCUMENTS

| | | | |
|---|---|---|---|
| 6,731,700 B1 | 5/2004 | Yakhnich et al. | |
| 7,363,553 B2 | 4/2008 | Cai et al. | |
| 7,684,712 B1 | 3/2010 | Roberts et al. | |
| 2002/0154704 A1* | 10/2002 | Reshef | 375/262 |
| 2008/0075183 A1 | 3/2008 | Ponnampalam et al. | |
| 2009/0132894 A1 | 5/2009 | Xu et al. | |
| 2010/0215371 A1* | 8/2010 | Djordevia et al. | 398/79 |

OTHER PUBLICATIONS

Cai, "Coherent Detection in Long-Haul Transmission Systems," Conference on Optical Fiber communication/National Fiber Optic Engineers Conference, 2008. OFC/NFOEC 2008, Feb. 24-28, 2008 (3 pages).

Noe, "PLL-free synchronous QPSK polarization multiplex/diversity receiver concept with digital I&Q baseband processing," IEEE Photonics Technology Letters, Issue Date: Apr. 2005, vol. 17 Issue:4 on pp. 887-889.

Ly-Gagnon, et al., "Coherent Detection of Optical Quadrature Phase-shift Keying Signals with Carrier Phase Estimation," Journal of Lightwave Technology, Issue Date: Jan. 2006, vol. 24 Issue: 1 on pp. 12-21.

Leven, et al., "Coherent Receivers for Practical Optical Communication Systems," Conference on Optical Fiber Communication and the National Fiber Optic Engineers Conference, 2007. OFC/NFOEC 2007. Issue Date: Mar. 25-29, 2007; on pp. 1-3.

International Search Report dated Mar. 2, 2012 issued in related International Patent Application No. PCT/US11/63169 (11 pages).

* cited by examiner

*Primary Examiner* — Shi K Li (57) ABSTRACT

A system and method for generating soft decision reliability information from hard decisions in an optical signal receiver. The receiver may include a digital signal processor including a symbol reliability function for generating symbol reliability information associated with symbols encoded on optical signal. The symbol reliability information may be generated as a function of the symbols and hard decision outputs associated with the symbols.

15 Claims, 6 Drawing Sheets

SYSTEM AND METHOD FOR GENERATING SOFT DECISION RELIABILITY INFORMATION FROM HARD DECISIONS IN AN OPTICAL SIGNAL RECEIVER

TECHNICAL FIELD

The present disclosure relates to optical signal data detection and more particularly, to a system and method for generating soft decision reliability information from hard decisions in an optical signal receiver.

BACKGROUND INFORMATION

Reliable optical communication systems use mechanisms for minimizing the effects of signal degradation occurring between associated transmitters and receivers. Signal degradation occurs due to a variety of factors and is exacerbated by the long-haul transmission distances and high optical channel counts required in many applications. Due to signal degradation, some transmitted data may be incorrectly interpreted at a receiver. If data is misinterpreted at a rate above that which is acceptable, the efficacy and viability of the system may be lost.

Forward Error Correction (FEC) is one technique used to help compensate for signal degradation and provide "margin improvements" to the system. Margin improvements generally allow an increase in amplifier spacing and/or increase in system capacity. In a Wavelength Division Multiplexing (WDM) system, for example, margin improvements obtained through FEC techniques may allow an increase in the bit rate of each WDM channel and/or a decrease in the spacing between WDM channels.

FEC generally involves insertion of a suitable error correction code into a transmitted data stream to facilitate detection and correction of data errors about which there is no previously known information. Error correction codes are generated in a FEC encoder for the data stream and are sent to a receiver including a FEC decoder. The FEC decoder recovers the error correction codes and uses them to correct any errors in the received data stream.

Of course, the efficacy of FEC techniques is impacted by the ability of the optical signal receiver to correctly detect transmitted data and error correction codes. Improvements in receiver signal detection thus translate to improved performance of FEC codes in providing correction of bit errors. One receiver configuration includes a decision circuit for converting the received data signal into a binary electrical signal, e.g. including logic ones and zeros representative of the transmitted data. The decision circuit may, for example, include a comparator for comparing the received data signal with a predetermined voltage level (the decision threshold). If the voltage level of the received data signal is above the decision threshold at a particular sample time, the comparator may output a logic one. If, however, the voltage level of the received data signal is below the decision threshold, the comparator may output a logic zero.

The decision circuit thus makes an initial decision (i.e., a hard decision) as to the data bit values of the received data stream. A "hard" decision or detector as used herein refers to a decision wherein a signal representative of a received data signal is compared to a single threshold to produce a single bit or symbol output for each of the data bit or symbol values of the received data stream. The FEC decoder detects and corrects errors in the data stream established by the hard decision circuit. Therefore, the setting of the decision threshold in the decision circuit is important in achieving optimal system bit error rate (BER).

One way to enhance FEC decoding capabilities is to use soft decision receivers or detectors in combination with soft decision FEC decoders. According to a soft decision schemes, the soft decision detector includes multiple decision circuits with different decision thresholds (e.g., different threshold voltage levels). The multiple decision circuits produce multiple bit "soft" "reliability" information, as compared to the single bit (i.e., a one or a zero) that is provided for hard decision detection. An n-bit soft decision scheme may use $2^n-1$ decision thresholds. Three decision thresholds may, for example, be used in a 2-bit soft decision scheme, and seven decision thresholds may be used in a 3-bit soft decision scheme. The multiple bit soft reliability information represents a confidence level in the received data and provides the FEC decoder with additional information, for example, whether the bit was very likely one, likely one, likely zero, or most likely zero. The extra information allows the use of more efficient soft decision FEC decoders, which allow operation in more noisy or more distorted channel conditions. Thus, as used herein a "soft" decision or detector refers to a decision wherein a signal representative of a received data signal is converted into multiple bit soft reliability information for each data bit or symbol value of the received data stream, the reliability information indicating a confidence level in the value (e.g. a digital "1" or "0") of each data bit or symbol.

The choice of data modulation format in optical communication systems also effects signal degradation and system capacity. One data modulation scheme that may be used in optical communication systems is phase shift keying (PSK) in which data is transmitted by modulating the phase of an optical wavelength such that the phase or phase transitions of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol.

PSK formats where data is encoded in phase transitions of the optical wavelength are known as differential formats. Differentially encoded PSK formats are described herein as "differential" (D), such as differential phase shift keying (DPSK), return-to-zero DPSK (RZ-DPSK), differential quadrature phase-shift keying (DQPSK), etc., if the encoding is reversed in demodulation e.g. in a hard or soft decision detector, or as "differential-coding" (DC), such as differential-coding phase-shift keying (DC-PSK), differential-coding quadrature phase-shift keying (DC-QPSK), etc, or if the encoding is reversed after demodulation in post-decision decoding.

In phase modulated optical communication systems, the receiver may be a coherent receiver using coherent detection, e.g. homodyne or heterodyne detection, to detect modulated optical signals. The term "coherent" when used herein in relation to a receiver refers to a receiver including a local oscillator (LO) for demodulating the received signal. Digital signal processing (DSP) may be implemented in such systems for processing the received signals to provide demodulated data. Digital signal processing of the received signal provides speed and flexibility, and may be used to perform a variety of functions including correction of nonlinearities associated with the optical transmission path such as chromatic dispersion, polarization mode dispersion, etc.

Coherent detection schemes for PSK systems include absolute-phase detection without differential decoding, absolute-phase detection with differential decoding, and differential phase detection. Absolute phase detection may involve making a decision, e.g. a soft decision, regarding the value of each bit in the received data stream based on an estimated phase. In one approach to differential decoding, a hard decision may be made on the current and previous received symbol ($s_n$ and $s_{n-1}$) to provide corresponding hard decision outputs ($h_n$ and $h_{n-1}$) and the differential phase may be found by taking the difference between the hard decisions ($\Delta\theta = \angle h_n - \angle h_{n-1}$). In one approach to differential phase detection, the differential phase may be found by taking the difference between received symbols ($\Delta\theta_{soft} = \angle s_n - \angle s_{n-1}$) and then making a hard or soft decision on $\Delta\theta_{soft} \Rightarrow \Delta\theta$.

Each one of these coherent detection schemes has its benefits and drawbacks. For instance, absolute-phase detection without differential decoding may provide acceptable receiver sensitivity and its soft-decision outputs may be directly used as decision reliability information in a succeeding soft-decision forward error correction (FEC). Without differential decoding, however, the scheme may not be tolerant to "cycle slip" (losing track of the phase of the received signal in the receiver), which may result in carrier phase off-tracking. Differential decoding can be used to make an absolute phase detection system cycle-slip tolerant, but can degrade the receiver sensitivity of the system. Another drawback for differential decoding is that the receiver may output only hard-decision values and thus, may not effectively support a succeeding soft-decision FEC.

Another way to resolve the cycle-slip issue in absolute phase detection is to use a differential phase detection scheme, in which no carrier phase tracking is required since detection is based on a comparison of phases between two bits. Although, the differential phase detection scheme can output soft decisions and support a succeeding soft-decision FEC, its receiver sensitivity may be worse than the other coherent detection schemes. Compared to the differential decoding with hard-decision FEC scheme, differential phase detection with soft-decision FEC can provide some extra coding gain from the soft-decision FEC. Most if not all of the extra coding, however, could be lost by the receiver sensitivity loss in differential phase detection.

BRIEF DESCRIPTION OF THE DRAWINGS

These and other features and advantages will be better understood by reading the following detailed description, taken together with the drawings wherein.

DETAILED DESCRIPTION

A system and method consistent with the present disclosure may be configured to perform differential decoding in a manner that generates reliability values for the differential decoding results that may be provided to a soft-decision FEC decoder. The reliability values may be based on symbol and corresponding hard decision values established prior to differential decoding. The system thus provides soft-decision differential decoding, as opposed to hard-decision FEC decoding which provides only hard decision outputs. Such a configuration allows the combination of differential decoding with a soft-decision FEC system and is cycle-slip tolerant. In addition, the system may maintain acceptable receiver sensitivity.

Figure 1:
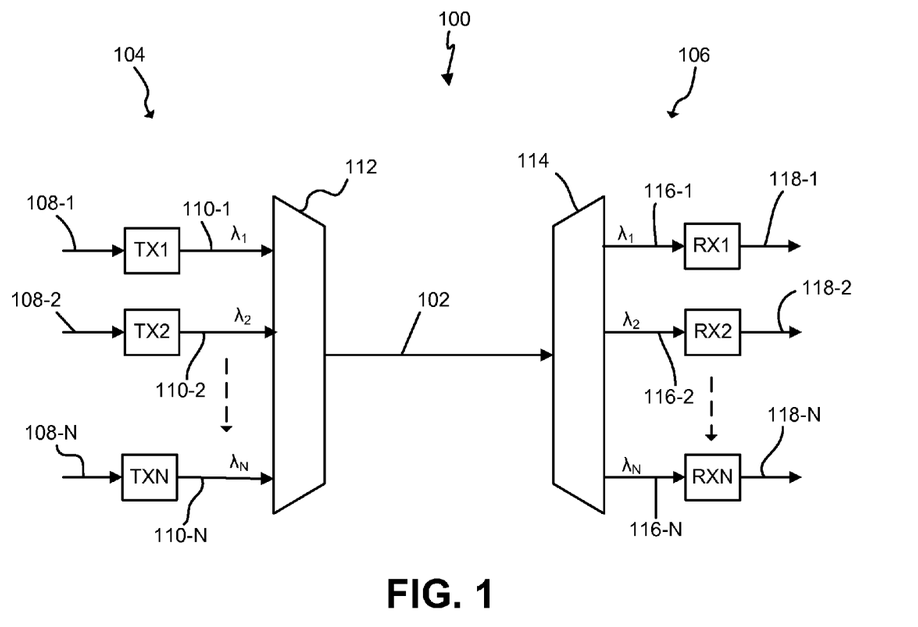
FIG. 1 is a block diagram of one exemplary embodiment of a system consistent with the present disclosure.

Turning now to FIG. 1 there is provided a simplified block diagram of one exemplary embodiment of a WDM transmission system 100 in which a detection system and method may be used consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system, and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength using a PSK modulation format, such as DPSK, QPSK, DBPSK, DQPSK, RZ-DPSK, RZ-DQPSK, etc. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information channel 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N.

Figure 2:
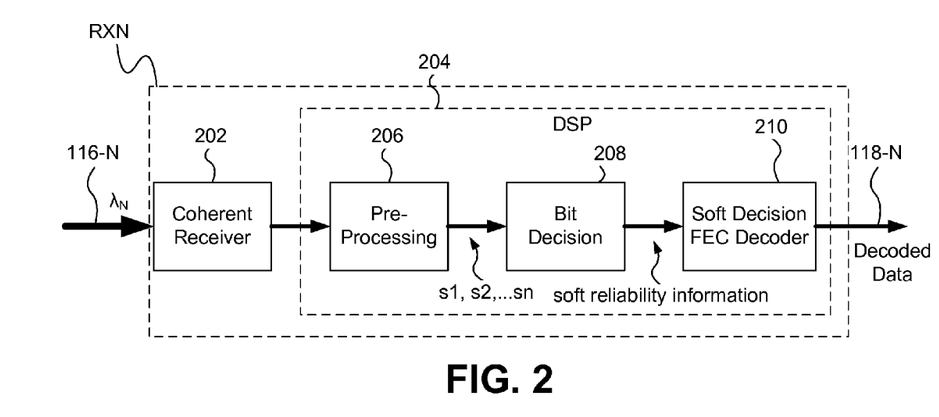
FIG. 2 is a block diagram of one exemplary embodiment of a receiver consistent with the present disclosure.

FIG. 2 is a simplified block diagram of a system consistent with the present disclosure including one exemplary receiver RXN consistent with the present disclosure. For simplicity and ease of explanation, the system is shown including only a single receiver for receiving only a single wavelength. It is to be understood that the system may be configured as a WDM system including demultiplexer and a plurality of receivers for receiving multiple wavelengths. In other embodiments, the DSP circuit 204 may be used in other communication systems with other types of receivers.

The illustrated exemplary embodiment, the receiver RXN, includes a coherent receiver configuration 202 for receiving an input signal from the transmitting terminal 104 on path 116-N and a digital signal processing (DSP) circuit 204 for processing the output of the coherent receiver 202 to provide an output data signal on path 118-N. Data is modulated on the carrier wavelength $\lambda_N$ of the optical input signal according to a PSK modulation format. The coherent receiver 202 receives the optical input signal, performs absolute phase detection, and produces digitized samples representing the phase of the symbols in the optical signal and thus the data modulated on the optical signal. The DSP circuit 204 may then process samples of the received signal to determine the data values (e.g., the bit values) represented by the samples and provides an output data stream on path 118-N representative of the data or bit values.

Figure 3:
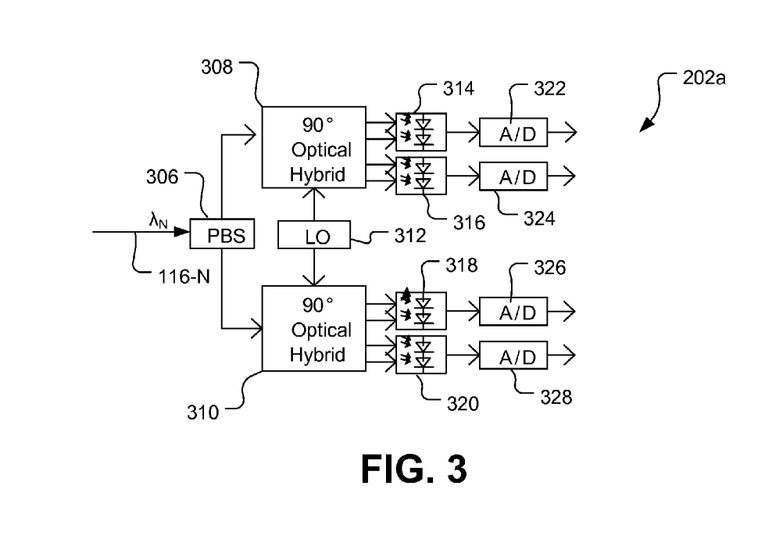
FIG. 3 is a block diagram of one exemplary embodiment of a coherent receiver portion of a receiver consistent with the present disclosure.

The coherent receiver 202 may take a configuration dependent upon the modulation format used in modulating data on the optical inputs signal. FIG. 3, for example, illustrates one exemplary coherent receiver configuration 202a useful for receiving a polarization multiplexed DC-QPSK input optical signal, e.g. on carrier wavelength $\lambda_N$. In the illustrated exemplary embodiment, the receiver 202a includes a polarization beam splitter (PBS) 306, first and second 90° optical hybrids 308, 310, a local oscillator (LO) 312, balanced detectors 314, 316, 318, 320 and analog-to-digital (A/D) converters 322, 324, 326, 328. In general, different polarizations of the input optical signal are split onto separate paths by the PBS 306. Each polarization is provided to an associated 90° optical hybrid 308, 310. Each optical hybrid mixes its input signal with the four quadrilateral states of the LO oscillator signal in the complex-field space. Each optical hybrid then delivers the four mixed signals to two pairs of balanced detectors 314, 316, 318, 320. The outputs of the balanced detectors are converted to digital signals by the A/D converters 322, 324, 326, 328.

The digital outputs of the coherent receiver, e.g. from A/D converters 322, 324, 326, 328, are provided as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a pre-processing function 206, a bit decision function 208 a soft decision FEC decoder function 210. The pre-processing function 206 receives digital outputs of the coherent receiver 202 and processes them to provide a serial stream of pre-processed digitized symbol outputs s1, s2 . . . sn each of which is representative of the phase of an associated one of the symbols in the optical signal and thus the data modulated on the optical signal. The bit decision function receives the symbol outputs s1, s2 . . . sn of the pre-processing function and uses the symbol outputs and their corresponding hard decisions to perform differential decoding and provide soft reliability information representative of the value of each bit in encoded in the optical signal received on path 116-N. The soft reliability information may be provided directly to the soft decision FEC decoder function which provides decoded data on path 118-N.

The pre-processing function 206, bit decision function 208 and soft decision decoder function 210 may be implemented in a variety of configurations using any combination of hardware, software and/or firmware Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

In one embodiment, the pre-processing function 206 of the DSP circuit 204 may include optical signal detection functions implemented in DSP-based coherent detection receivers. The pre-processing function 206 may include, for example, a waveform recovery and alignment function, a deterministic distortion compensation function, a clock recovery function, a synchronized data re-sampling function, a polarization tracking and polarization mode dispersion (PMD) compensation function, a local oscillator (LO) frequency offset tracking function and/or a carrier phase estimation function. For example, a LO frequency offset tracking function may be configured as described in U.S. Patent Publication No. 20100232805, the teachings of which are hereby incorporated herein by reference. A carrier phase estimation function may be configured as described in U.S. Patent Publication No. 20100232788, the teachings of which are hereby incorporating herein by reference.

Figure 4:
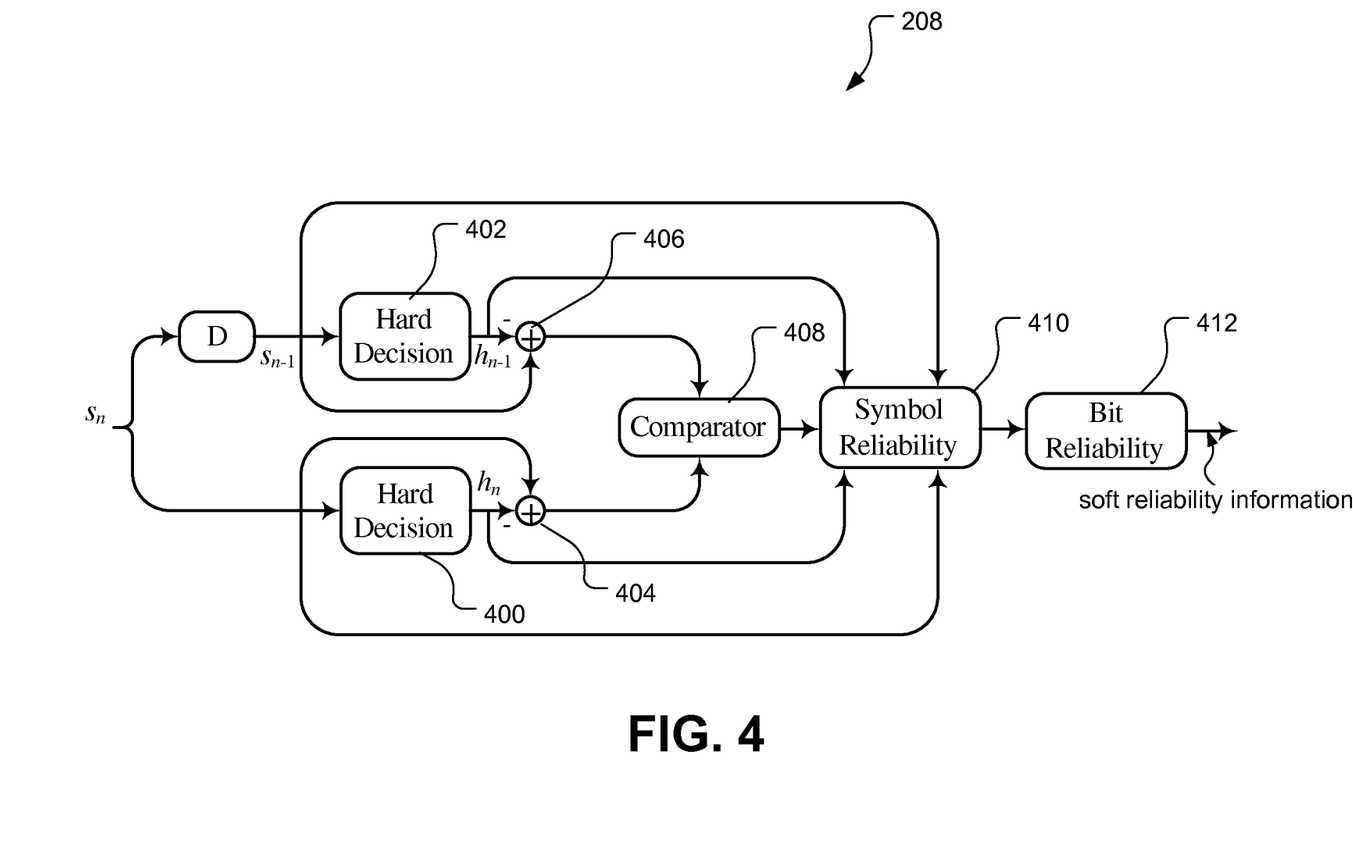
FIG. 4 is a block diagram illustrating one exemplary embodiment of a bit decision function useful in a receiver consistent with the present disclosure.

FIG. 4 is a block diagram of one exemplary embodiment of a bit decision function 208 consistent with the present disclosure. In a differential coding modulation format, e.g. a DC-MPSK modulation format, the symbol outputs s1, s2 . . . sn of the pre-processing function 206 represent the results of absolute phase detection performed by the coherent receiver 202 and therefore do not directly represent the soft reliability information provided at the output of the bit decision function 208. The symbol outputs s1, s2 . . . sn may thus be considered soft decisions. In general, a bit decision function 208 consistent with the present disclosure receives the soft decision symbol outputs s1, s2 . . . sn, performs differential decoding, and generates decision reliability values for differential decoding results as a function of symbol outputs s1, s2 . . . sn and their corresponding hard decisions, i.e. h1, h2 . . . hn, respectively. The reliability values for the differential decoding results may be provided directly to the soft-decision FEC decoder function 210.

In the illustrated embodiment, the bit decision function 208 receives a symbol output $s_n$, which represents the result of absolute phase detection for a received symbol at time n. A hard decision is made for each symbol $s_n$ and the following symbol $s_{n-1}$, as illustrated by delay D, in an associated hard decision function 400, 402, respectively. The hard decision functions 400, 402 each compare its input symbol to a single threshold to provide a hard decision output. In particular, hard decision function 400 compares input symbol 5, to a single threshold to produce a hard decision $h_n$ associated with the symbol $s_n$. Hard decision function 402 compares input symbol $s_{n-1}$ to a single threshold to produce a hard decision $h_{n-1}$ associated with the symbol $s_{n-1}$.

Following hard decision, the Euclidean distance from each symbol $s_n$, $s_{n-1}$ to its corresponding hard decision $h_n$, $h_{n-1}$ may be taken in summation functions 404, 406, respectively. In particular, the Euclidean distance $d_n$ associated with symbol $s_n$, is taken as $d_n=|s_n-h_n|$ in the hard decision function 404, and the Euclidean distance $d_{n-1}$ associated with symbol $s_{n-1}$ is taken as $d_{n-1}=|s_{n-1}-h_{n-1}|$ in the hard decision function 406. A comparator function 408 determines min($d_n,d_{n-1}$) (i.e. the shortest Euclidean distance) and uses min($d_n,d_{n-1}$) to generate reliability information used for differential decoding.

Using shortest Euclidean distance, min($d_n,d_{n-1}$), allows a 50% reduction in the subsequent reliability calculations, which thereby reduces processing time and complexity. In general, using the shortest Euclidean distance assumes the symbol with the smaller Euclidean distance to its corresponding hard decision to be the symbol with the correct absolute phase. Making such a decision does not lead to incorrect differential coding decisions as eventually two symbols are used to make the final decision, and what controls the outcome of the differential decoding is the phase difference between two consecutive symbols, not the absolute phase of one of them.

Soft reliability information for each symbol (i.e. symbol reliabilities) are then calculated using a symbol reliability function 410 as a function of $s_n$, $s_{n-1}$, $h_n$, $h_{n-1}$ and min($d_n,d_{n-1}$) and based on the differential encoding mapping rules. The differential encoding mapping rules depend on the differentially encoded modulation format chosen for the application. An example of the differential encoding mapping rules/look-up table for a DC-MPSK modulation format is set forth in Table 1 below.

TABLE 1

DIFFERENTIAL ENCODING MAPPING RULES/LOOK-UP TABLE FOR A DC-MPSK SYSTEM.

| Input symbol | $\Delta\theta = (\angle s_n - \angle s_{n-1})$ |
|---|---|
| $h_0$ | 0 |
| $h_1$ | $\theta_1$ |
| ... | ... |
| $h_{M-1}$ | $\pi$ |

The soft decision reliability information provided by the symbol reliabilities function 410 is then provided to a bit reliability function 412, which produces soft decision reliabilities for each bit. The reliability information for each bit is then provided to the soft decision FEC decoder function 210 (FIG. 2) for decoding.

Figure 5:
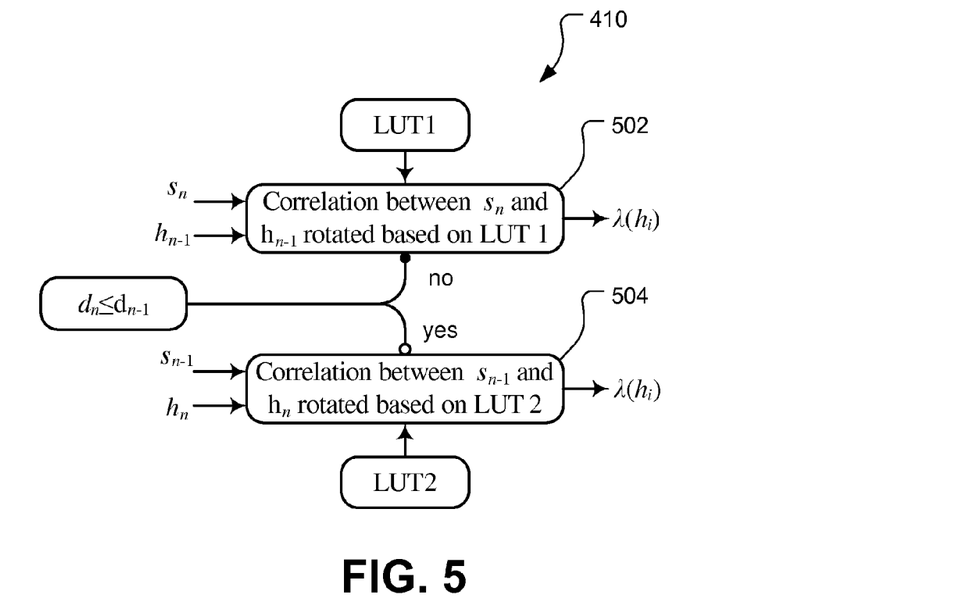
FIG. 5 is a block diagram illustrating one exemplary embodiment of a symbol reliability function useful in a bit decision function consistent with the present disclosure.

In one embodiment, the symbol reliability function 410 may generate soft reliability information for each symbol s1, s2 ... sn using Euclidean distance, log-likelihood ratios (LLRs), or another approach. FIG. 5 diagrammatically illustrates one method of generating symbol reliability information bounded by LLRs in a symbol reliability function 410 consistent with the present disclosure. As shown, given a differential encoding rule or look-up table (LUT), a first (LUT1) and second (LUT2) look up table may be established. The first (LUT1) and second (LUT2) look-up table may have complementary values for the change in phase ($\Delta\theta$) associated with a given symbol.

As shown, based on the result of the comparator function 410, if $d_n>d_{n-1}$ then a first correlation function 502 may determine a correlation between $s_n$, and $h_{n-1}$ based on the first look-up table LUT1 to provide the symbol reliabilities $\lambda(h_i)$. If $d_n \leq d_{n-1}$ then a second correlation function 504 may determine a correlation between $s_{n-1}$, and $h_n$ based on the second look-up table LUT2 to provide the symbol reliabilities $\lambda(h_i)$. In one embodiment, for example, the symbol LLRs may be calculated as follows:

$$\lambda(h_i) \propto \begin{cases} \max(|s_n - h_n|, |s_{n-1} - h_n e^{-j\theta_i}|) \propto |s_{n-1} - h_n e^{-j\theta_i}|, & d_n \leq d_{n-1} \\ \max(|s_n - h_{n-1} e^{j\theta_i}|, |s_{n-1} - h_{n-1}|) \propto |s_n - h_{n-1} e^{j\theta_i}|, & d_n > d_{n-1} \end{cases} \quad (1)$$

Figure 6:
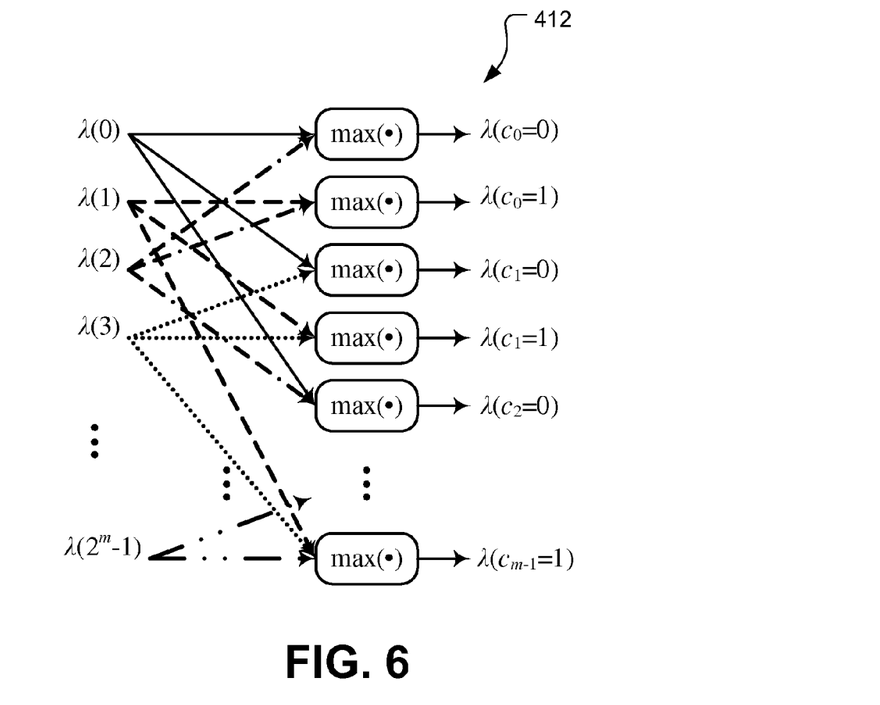
FIG. 6 is a block diagram illustrating one exemplary embodiment of a bit reliability function useful in a bit decision function consistent with the present disclosure.

In one embodiment, the bit reliability function 412 may generate soft reliability information for each bit from the symbol reliability information $\lambda(h_i)$ using Euclidean distance, log-likelihood ratios (LLRs), or another approach. FIG. 6 diagrammatically illustrates one method of generating bit reliability information bounded by LLRs in a bit reliability function 412 consistent with the present disclosure. In FIG. 6, the LLR for the bit $c_j=\{0,1\}$ is calculated from the symbol LLRs $\lambda(h_i)$ with each symbol $h_i$ defined as $h_i=c_0 c_1 L c_{m-1}$ and m=log,(M) with M being the modulation format level of a DC-MPSK. In one embodiment, the bit LLRs $\lambda(c_j)$ may be calculated as follows:

$$\lambda(c_j=0) = \log\left[\sum_{h_i:c_j=0} \exp(\lambda(h_i))\right] \quad (2)$$

$$\lambda(c_j=1) = \log\left[\sum_{h_i:c_j=1} \exp(\lambda(h_i))\right].$$

The bit LLRS $\lambda(c_j)$ provide multiple bit soft reliability information representing a confidence level or reliability of the received data (e.g., whether a bit is very likely one, likely one, likely zero, or most likely zero). This soft reliability information may be provided to the soft decision FEC decoder function 210. FEC involves insertion of a suitable error correction code into a transmitted data stream to facilitate detection and correction of data errors about which there is no previously known information. Error correction codes are generated in an FEC encoder (e.g., in the transmitter 104) for the data stream. FEC encoding/decoding may be implemented according to FEC schemes including, but not limited to, the linear and cyclic Hamming codes, the cyclic Bose-Chaudhuri-Hocquenghem (BCH) codes, the convolutional (Viterbi) codes, the cyclic Golay and Fire codes, and some newer codes such as the Turbo convolutional and product codes (TCC, TPC) and the low density parity check (LDPC) code.

In general, the soft decision FEC decoder function 210 receives the soft reliability information data stream from the bit decision function 208, recovers the FEC error correction codes, uses them to correct any errors in the received data stream, and provides the decoded data stream 118-N. Examples of soft decision FEC are disclosed in greater detail in U.S. Pat. No. 7,398,454, U.S. Patent Application Publication No. 2006/0136798, and U.S. patent application Ser. No. 12/108,155, all of which are fully incorporated herein by reference.

In one embodiment of a system and method consistent with the present disclosure wherein symbols are encoded according to DC-QPSK modulation format with an additive white Gaussian noise, LUT1 and LUT2 (FIG. 5) for the symbol reliability function 410 may be defined as set forth below in tables 2 and 3, respectively.

TABLE 2

SYMBOL LLRS CALCULATION FOR DC-QPSK
SYSTEM - LOOK-UP TABLE 1 (LUT1)

| $\lambda(h_i)$ | $\Delta\theta$ |
|---|---|
| $\lambda(00)$ | 0 |
| $\lambda(01)$ | $\pi/2$ |
| $\lambda(10)$ | $-\pi/2$ |
| $\lambda(11)$ | $\pi$ |

TABLE 3

SYMBOL LLRS CALCULATION FOR DC-QPSK
SYSTEM - LOOK-UP TABLE 2 (LUT2)

| $\lambda(h_i)$ | $\Delta\theta$ |
|---|---|
| $\lambda(00)$ | 0 |
| $\lambda(01)$ | $-\pi/2$ |
| $\lambda(10)$ | $\pi/2$ |
| $\lambda(11)$ | $\pi$ |

With reference to FIG. 5, in such an embodiment, if $d_n > d_{n-1}$, then $\lambda(h_i)$ may be calculated as:

$$\lambda(h_i) = \frac{\sqrt{(s_n - h_{n-1}e^{j\Delta\theta})^2}}{2\sqrt{2}\,\sigma^2}$$

where $\Delta$ is based on LUT1 from Table 2, and if $d_n \le d_{n-1}$, then $\lambda(h_i)$ may be calculated as:

$$\lambda(h_i) = \frac{\sqrt{(s_{n-1} - h_n e^{j\Delta\theta})^2}}{2\sqrt{2}\,\sigma^2}$$

where $\Delta\theta$ is based of LUT2 from Table 3, where $\sigma^2$ is the variance (the measure of the width of the distribution) of the additive white Gaussian noise.

The bit LLRS $\lambda$ ($c_j$) in such an embodiment may then be calculated as:

$\lambda(c_0=0)=\log(\exp(\lambda(\underline{0}0))+\exp(\lambda(\underline{0}1)))$ $\lambda(c_0=1)=\log(\exp(\lambda(\underline{1}0))+\exp(\lambda(\underline{1}1)))$ $\lambda(c_1=0)=\log(\exp(\lambda(0\underline{0}))+\exp(\lambda(1\underline{0})))$ $\lambda(c_1=1)=\log(\exp(\lambda(0\underline{1}))+\exp(\lambda(1\underline{1})))$  (5)

Figure 7:
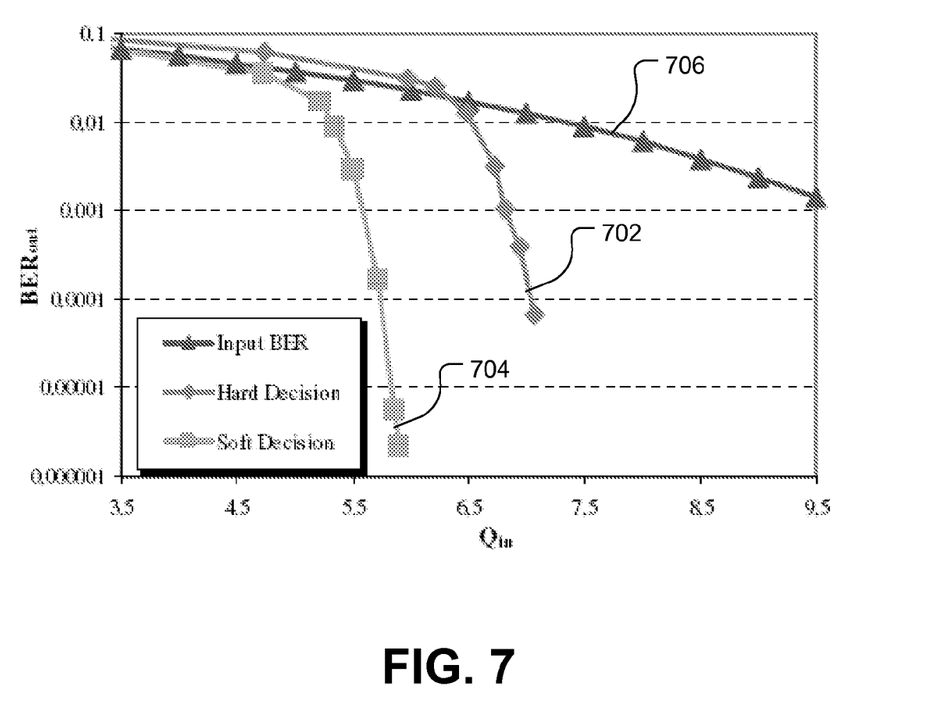
FIG. 7 is a plot illustrating input Q factor vs. bit error rate (BER) output for a system consistent with the present disclosure and a system including differential decoding with only a hard decision output with a specified input BER.

FIG. 7 includes plots 702, 704 of input Q factor ($Q_{in}$) vs. output bit error rate ($BER_{out}$) illustrating performance of a simulated system consistent with the present disclosure using a DC-QPSK signal with an input bit error rate is as shown in plot 706 and using an LDPC FEC code of code rate 0.81. Plot 704 illustrates $Q_{in}$ vs. $BER_{out}$ for a system that generates soft decision reliability information from the DC-QPSK signal and provides the soft reliability information to a soft decision FEC decoder consistent with the present disclosure. Plot 702 illustrates $Q_{in}$ vs. $BER_{out}$ for a system that performs only hard decision decoding of the DC-QPSK signal. As shown, a system and method consistent with the present disclosure may achieve about 1.3 dB improvement over a hard decision differential decoding detector.

Figure 8:
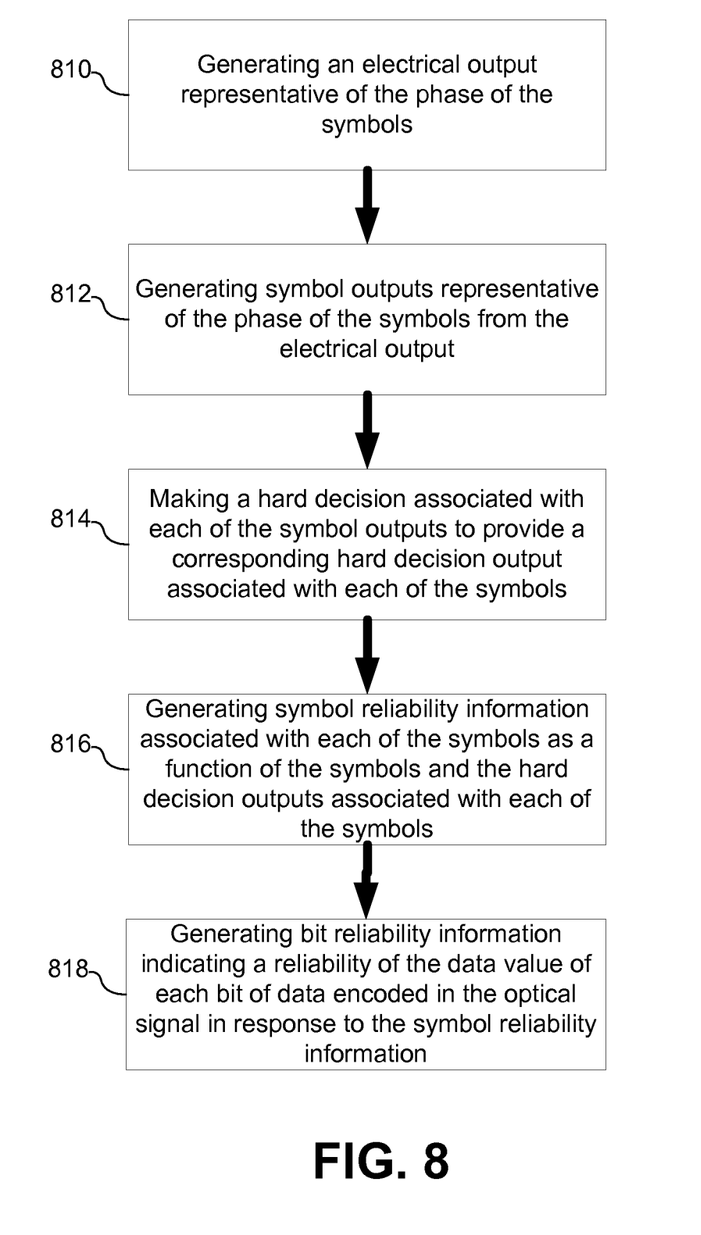
FIG. 8 is a block flow diagram illustrating an exemplary method consistent with the present disclosure.

FIG. 8 is a block flow diagram illustrating an exemplary method consistent with the present disclosure. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

As shown in FIG. 8, in a method of decoding an optical signal having a plurality of symbols modulated thereon according to a PSK modulation format consistent with the present disclosure an electrical output representative of the phase of the symbols may be generated 810. Symbol outputs representative of the phase of the symbols may then be generated 812 from the electrical output. A hard decision associated with each of the symbol outputs may be made 814 to provide a corresponding hard decision output associated with each of the symbols. Symbol reliability information associated with each of the symbols may then be generated 816 as a function of the symbols and the hard decision outputs associated with each of the symbols. Bit reliability information indicating a reliability of the data value of each bit of data encoded in the optical signal may then be generated 818 in response to the symbol reliability information.

There is thus provided a system and method for receiving a PSK-modulated optical signal with coherent detection that generates reliability information for soft decision FEC decoding. Extracting soft information from the received differentially encoded signal before differential decoding performs similar to absolute-phase coherent detection, but is cycle-slip tolerant.

Consistent with one embodiment, there is provided an optical signal receiver including a digital signal processor (DSP) configured to receive an electrical output representative of the phase of each of a plurality of symbols modulated onto an optical signal according to a phase-shift keying (PSK) modulation format and to generate symbol outputs representative of the phase of the symbols and make a hard decision associated with each of the symbol outputs to provide a corresponding hard decision output associated with each of the symbols. The DSP may include a symbol reliability function for generating symbol reliability information associated with each of the symbols as a function of the symbols and the hard decision outputs associated with the symbols, and a bit reliability function for generating bit reliability information indicating a reliability of the data value of each bit of data encoded on the optical signal in response to the symbol reliability information.

Consistent with another embodiment, there is provided an optical signal receiver including: a coherent receiver configured to receive an optical signal having a plurality of symbols modulated thereon according to a phase-shift keying (PSK) modulation format that encodes a plurality of bits of data on each of the symbols, the coherent receiver configured to provide an electrical output representative of the phase of the symbols; and a digital signal processor (DSP) configured to receive the electrical output and generate symbol outputs representative of the phase of the symbols and make a hard decision associated with each of the symbol outputs to provide a corresponding hard decision output associated with each of the symbols, the DSP further configured to determine a first Euclidean distance from a first one of the symbols to a first one of the hard decisions associated with the first one of the symbols and to determine a second Euclidean distance from a second one of the symbols to a second one of the hard decisions associated with the second one of the symbols. The DSP may include: a symbol reliability function for generating symbol reliability information associated with each of the symbols as a function of a correlation between the first symbol and the second hard decision rotated based on a first look-up table if the first Euclidean distance is greater than the second Euclidean distance and as a function of a correlation between the second symbol and the first hard decision rotated based on a second look-up table if the first Euclidean distance is less than the second Euclidean distance, and a bit reliability function for generating bit reliability information indicating a reliability of the data value of each of the bits of data encoded in the optical signal in response to the symbol reliability information. The receiver may also include a soft-decision forward error correction (FEC) decoder for receiving the bit reliability information and providing an output representative of the data.

Consistent with another embodiment, there is provided a method of decoding an optical signal having a plurality of symbols modulated thereon according to a PSK modulation format, the method including: generating an electrical output representative of the phase of the symbols; generating symbol outputs representative of the phase of the symbols from the electrical output; making a hard decision associated with each of the symbol outputs to provide a corresponding hard decision output associated with each of the symbols; generating symbol reliability information associated with each of the symbols as a function of the symbols and the hard decision outputs associated with each of the symbols; and generating bit reliability information indicating a reliability of the data value of each bit of data encoded in the optical signal in response to the symbol reliability information.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical signal receiver comprising:
   a digital signal processor (DSP) configured to receive an electrical output representative of the phase of each of a plurality of symbols modulated onto an optical signal according to a phase-shift keying (PSK) modulation format and to generate symbol outputs representative of the phase of said symbols and make a hard decision associated with each of said symbol outputs to provide a corresponding hard decision output associated with each of said symbols, said DSP comprising:
      a symbol reliability function for generating symbol reliability information associated with each of said symbols as a function of said symbols and said hard decision outputs associated with said symbols, and
      a bit reliability function for generating bit reliability information indicating a reliability of the data value of each bit of data encoded on said optical signal in response to said symbol reliability information,
      wherein said symbol reliability function is configured to determine a first Euclidean distance from a first one of said symbols to a first one of said hard decisions associated with said first one of said symbols and to determine a second Euclidean distance from a second one of said symbols to a second one of said hard decisions associated with said second one of said symbols,
      wherein said symbol reliability information is a function of a correlation between said first symbol and said second hard decision rotated based on a first look-up table if said first Euclidean distance is greater than said second Euclidean distance and is a function of a correlation between said second symbol and said first hard decision rotated based on a second look-up table if said first Euclidean distance is less than said second Euclidean distance.

2. The system of claim 1, said system further comprising a coherent receiver configured for receiving said optical signal and generating said electrical output.

3. The system of claim 1, said system further comprising a soft-decision forward error correction (FEC) decoder for receiving said bit reliability information and providing an output representative of said data.

4. The system of claim 1, wherein said symbol reliability information is a function of said first and second Euclidean distances.

5. The system of claim 1, wherein said symbol reliability information is a function of said first and second Euclidean distances, said first and second symbols and said first and second hard decisions.

6. The system of claim 1, wherein said symbol reliability information is generated using log-likelihood ratios (LLRs).

7. The system of claim 1, wherein said bit reliability information is generated using log-likelihood ratios (LLRs).

8. An optical signal receiver comprising:
   a coherent receiver configured to receive an optical signal having a plurality of symbols modulated thereon according to a phase-shift keying (PSK) modulation format that encodes a plurality of bits of data on each of said symbols, said coherent receiver configured to provide an electrical output representative of the phase of said symbols; and
   a digital signal processor (DSP) configured to receive said electrical output and generate symbol outputs representative of the phase of the symbols and make a hard decision associated with each of said symbol outputs to provide a corresponding hard decision output associated with each of said symbols, said DSP further configured to determine a first Euclidean distance from a first one of said symbols to a first one of said hard decisions associated with said first one of said symbols and to determine a second Euclidean distance from a second one of said symbols to a second one of said hard decisions associated with said second one of said symbols, said DSP comprising:
      a symbol reliability function for generating symbol reliability information associated with each of said symbols as a function of a correlation between said first symbol and said second hard decision rotated based on a first look-up table if said first Euclidean distance is greater than said second Euclidean distance and as a function of a correlation between said second symbol and said first hard decision rotated based on a second look-up table if said first Euclidean distance is less than said second Euclidean distance, and
      a bit reliability function for generating bit reliability information indicating a reliability of the data value of each of said bits of data encoded in said optical signal in response to said symbol reliability information; and
   soft-decision forward error correction (FEC) decoder for receiving said bit reliability information and providing an output representative of said data.

9. A method of decoding an optical signal having a plurality of symbols modulated thereon according to a PSK modulation format, the method comprising:

generating an electrical output representative of the phase of said symbols;

generating symbol outputs representative of the phase of the symbols from said electrical output;

making a hard decision associated with each of said symbol outputs to provide a corresponding hard decision output associated with each of said symbols;

generating symbol reliability information associated with each of said symbols as a function of said symbols and said hard decision outputs associated with each of said symbols; and generating bit reliability information indicating a reliability of the data value of each bit of data encoded in said optical signal in response to said symbol reliability information wherein said generating symbol reliability information comprises:

determining a first Euclidean distance from a first one of said symbols to a first one of said hard decisions associated with said first one of said symbols, and determining a second Euclidean distance from a second one of said symbols to a second one of said hard decisions associated with said second one of said symbols, and wherein said symbol reliability information is generated as a function of a correlation between said first symbol and said second hard decision rotated based on a first look-up table if said first Euclidean distance is greater than said second Euclidean distance and is generated as a function of a correlation between said second symbol and said first hard decision rotated based on a second look-up table if said first Euclidean distance is less than said second Euclidean distance.

10. The method of claim 9, wherein said electrical output is generated by a coherent receiver.

11. The method of claim 9, said method further comprising receiving said bit reliability information in a soft-decision forward error correction (FEC) decoder configured for providing an output representative of said data.

12. The method of claim 9, wherein said symbol reliability information is generated as a function of said first and second Euclidean distances.

13. The method of claim 9, wherein said symbol reliability information is generated as a function of said first and second Euclidean distances, said first and second symbols and said first and second hard decisions.

14. The method of claim 9, wherein said symbol reliability information is generated using log-likelihood ratios (LLRs).

15. The method of claim 9, wherein said bit reliability information is generated using log-likelihood ratios (LLRs).

* * * * *